(12) United States Patent
Eccles et al.

(10) Patent No.: US 7,376,091 B1
(45) Date of Patent: May 20, 2008

(54) WIRELESS BRIDGE FOR INTERFACING AN 802.11 NETWORK WITH A CELLULAR NETWORK

(75) Inventors: Ryan M. Eccles, Belton, MO (US); Jeffrey B. Danley, Greenwood, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1034 days.

(21) Appl. No.: 10/200,263

(22) Filed: Jul. 22, 2002

(51) Int. Cl.
*H04L 12/16* (2006.01)

(52) U.S. Cl. ...................... 370/265; 370/466

(58) Field of Classification Search ............... 370/310, 370/319, 320, 328, 338, 342, 401, 445, 463, 370/224, 225, 227, 230, 232, 236, 310.2, 370/335, 349, 465, 466, 467, 469, 471, 331, 370/265, 402; 709/224, 225, 227, 230, 232, 709/236
See application file for complete search history.

(56) References Cited

U.S. PATENT DOCUMENTS

| | | | | |
|---|---|---|---|---|
| 5,737,703 | A | 4/1998 | Byrne | 455/442 |
| 5,774,461 | A | 6/1998 | Hyden et al. | 370/329 |
| 6,115,762 | A | 9/2000 | Bell et al. | 710/62 |
| 6,205,495 | B1 | 3/2001 | Gilbert et al. | 710/8 |
| 6,292,747 | B1 | 9/2001 | Amro et al. | 701/213 |
| 6,327,254 | B1 | 12/2001 | Chuah | 370/328 |
| 6,330,244 | B1 | 12/2001 | Swartz et al. | 370/401 |
| 6,438,117 | B1 | 8/2002 | Grilli et al. | 370/331 |
| 6,680,923 | B1 | 1/2004 | Leon | 370/328 |
| 6,850,512 | B1 * | 2/2005 | Bishop et al. | 370/342 |
| 2001/0036830 | A1 | 11/2001 | Wu et al. | 455/436 |
| 2003/0091021 | A1 | 5/2003 | Trossen et al. | 370/349 |
| 2003/0156566 | A1 * | 8/2003 | Griswold et al. | 370/338 |
| 2003/0171112 | A1 * | 9/2003 | Lupper et al. | 455/414.1 |
| 2003/0202497 | A1 * | 10/2003 | Csapo | 370/338 |
| 2004/0009751 | A1 * | 1/2004 | Michaelis et al. | 455/62 |
| 2004/0196978 | A1 * | 10/2004 | Godfrey et al. | 380/270 |
| 2006/0025077 | A1 * | 2/2006 | Haller et al. | 455/41.2 |

OTHER PUBLICATIONS

Internet Engineering Task Force ("IETF") Request for Comments ("RFCs") 768, "User Datagram Protocol," J. Postel, Aug. 1980.
Internet Engineering Task Force ("IETF") Request for Comments ("RFCs") 791, "Internet Protocol DARPA Internet Program Protocol Specification," Information Sciences Institute, Sep. 1981.
Internet Engineering Task Force ("IETF") Request for Comments ("RFCs") 793, "Transmission Control Protocol DARPA Internet Program Protocol Specification," Information Sciences Institute, Sep. 1981.
Internet Engineering Task Force ("IETF") Request for Comments ("RFCs") 2002, "IP Mobility Support," C. Perkins, Oct. 1996.

(Continued)

*Primary Examiner*—Brenda Pham

(57) ABSTRACT

A network access point can serve as a bridge between an 802.11 network and a cellular network. The network access point can receive packets from the 802.11 network and reformat the packets for transmission over the cellular network. Similarly, the network access point can receive packets from the cellular network and reformat them for transmission over the 802.11 network.

20 Claims, 13 Drawing Sheets

OTHER PUBLICATIONS

Internet Engineering Task Force ("IETF") Request for Comments ("RFCs") 2003, "IP Encapsulation within IP," C. Perkins, Oct. 1996.

Internet Engineering Task Force ("IETF") Request for Comments ("RFCs") 2004, "Minimal Encapsulation within IP," C. Perkins, Oct. 1996.

Internet Engineering Task force ("IETF") Request for Comments ("RFCs") 2005, "Applicability Statement for IP Mobility Support," J. Solomon, Oct. 1996.

"802.11b and 3G Synergies for 2002," 802.11 Insights, http://www.80211-planet.com/columns/article/0,4000,1781_950811,00.html, printed Feb. 22, 2002.

"E-200 Cassiopeia Pocket PC 2002," Casio, http://www.casio.com/personalpcs/product.cfm?section=19&product=4146, printed Feb. 22, 2002.

"Making Notebooks Truly Mobile," T Techtv, http://www.techtv.com/freshgear/products/story/0,23008,3347281,00.html., printed Feb. 25, 2002.

"Product Description," WeRoam, http://www.weroam.com/, printed Feb. 25, 2002.

"Roaming Between WLAN and GSM Networks to Become Easier," thinkmobile, http://www.thinkmobile.com/laptops/news/00/48/33/, printed Feb. 25, 2002.

Erick Schonfeld, "The Island of the Wireless Guerrillas," Business 2.0, Apr. 2002 Issue, printed on Mar. 21, 2002 from http://www.business2.com.

P. Srisuresh et al., "Traditional IP Network Address Translator (Traditional NAT)," Network Working Group, Request for Comments 3022, Jan. 2001.

* cited by examiner

802.11 MAC Sublayer Data Frame

| Frame Control 80 | Duration ID 82 | Address 1 84 |
| --- | --- | --- |
| Address 2 86 | Address 3 88 | Sequence Control 90 |
| Address 4 92 | Frame Body 94 | FCS 96 |

FIG. 2

WIRELESS BRIDGE FOR INTERFACING AN 802.11 NETWORK WITH A CELLULAR NETWORK

FIELD OF THE INVENTION

The present invention relates generally to wireless data communications. More specifically, it relates to 802.11 networks and cellular networks.

BACKGROUND OF THE INVENTION

One or more devices can connect in a wireless local area network ("WLAN") using the Institute of Electrical and Electronics Engineers 802.11 standard. The 802.11 standard provides a physical layer protocol that can be used to transmit physical bits of information across a wireless interface of the 802.11 WLAN. The 802.11 standard also provides a MAC sub-layer format, which can be used to format bits of information into packets of data. The formatted MAC sub-layer packets can then be transmitted to other devices on the 802.11 WLAN using the physical layer protocol.

Using the 802.11 standard, two or more devices can wirelessly connect with each other and exchange data. In an ad-hoc configuration, the wireless devices can exchange data directly with other wireless devices on the 802.11 WLAN. In a basic service set configuration, an access point can serve as an intermediary for communication between devices on the 802.11 WLAN. Thus, a device sends a packet to the access point, which then relays the packet to its intended destination device.

The access point can also be used to provide connectivity to other networks. For example, the access point can connect over a wired link to another access point. This configuration, which is termed an extended service set, links two or more basic service sets. In this configuration, a device in one basic service set can exchange data with a device in another basic service set.

In another example, the access point connects via a wired link to another network, such as the Internet. Using this connectivity, a device on the 802.11 WLAN can exchange data with a device on the other connected network, such as the Internet. While this configuration allows for increased access by devices on the 802.11 WLAN, it has several disadvantages.

In one example of a disadvantage, the wired link to the other network limits the mobility of the 802.11 WLAN. The 802.11 WLAN is confined to a fixed location by the wired connection and cannot be easily moved without rewiring the connection to the access point. In another example of a disadvantage, the wired connection to another network increases the difficulty of setting-up an 802.11 WLAN. In order to set-up the 802.11 WLAN, the access point's location must be known. Then, the wired link can be installed at the access point's location. Installing a wired connection can include running cabling to the location of the access point, which can be expensive and time-consuming.

Therefore, there exists a need for a better way to connect an access point in an 802.11 WLAN with other networks.

SUMMARY OF THE INVENTION

A Network Access Point ("NAP") can connect to one or more devices in a wireless local area network ("WLAN"). The devices in the WLAN can communicate using the Institute of Electrical and Electronics Engineers 802.11 standard. The 802.11 standard generally provides physical layer and MAC sub-layer formats that the devices on the WLAN can use to exchange data.

The NAP can additionally wirelessly connect to a cellular network. The cellular network can in turn connect to the Internet or to another network. The cellular network, however, may use different physical layer and Medium Access Control ("MAC") sub-layer formats than the 802.11 WLAN. The NAP can convert between the physical and MAC sub-layer formats used by the 802.11 WLAN and the physical and MAC sub-layer formats used by the cellular network. Thus, via the cellular network, the NAP can provide connectivity between the WLAN and another network, such as the Internet.

In one principal aspect, a device on the 802.11 WLAN can send a message over the cellular network to a device on another network, such as the Internet. For example, the NAP can receive a message from a device on the 802.11 WLAN. The NAP can convert the message from the 802.11 format to a cellular network format. Then, it can send the message over the cellular network to a destination device, such as a device on the Internet.

In another principal aspect, a device on the Internet, or on another network, can send a message to a device on the 802.11 WLAN. For example, a device on the Internet can send a message to a device on the 802.11 WLAN. The message can be sent from the device via the cellular network where it is received by the NAP. The NAP can convert the message from a format used by the cellular network format into the 802.11 WLAN format. Then, the NAP can send the message to the device on the 802.11 WLAN.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which:

FIG. 2 is a block diagram illustrating an exemplary 802.11 MAC Sub-layer Data Frame;

DETAILED DESCRIPTION OF EXEMPLARY EMBODIMENTS

1. Exemplary Architecture

Figure 1:
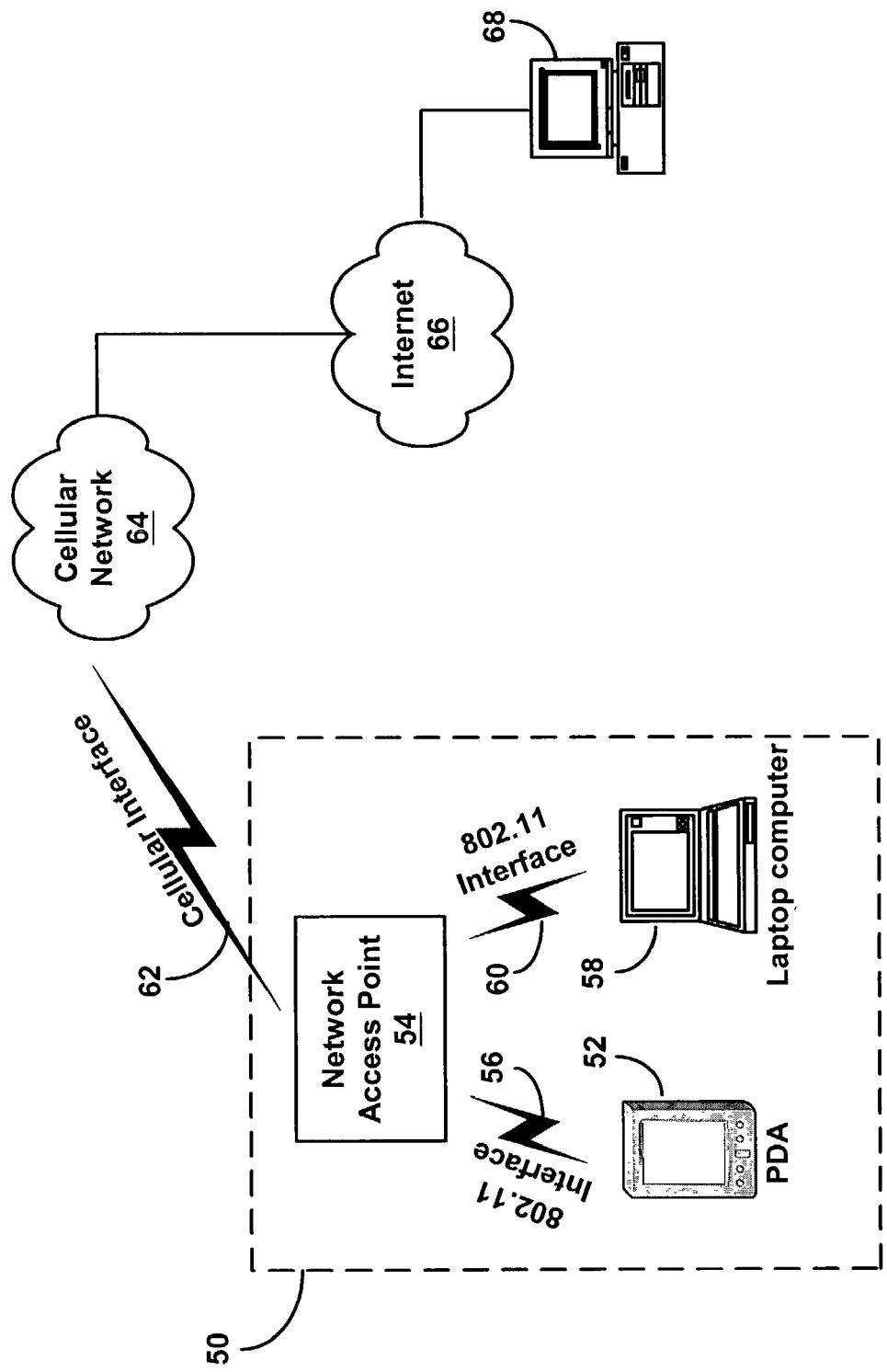
FIG. 1 is a block diagram illustrating an exemplary configuration for bridging an 802.11 WLAN and a cellular network using a Network Access Point.

FIG. 1 shows an exemplary configuration for bridging an 802.11 network and a cellular network. The IEEE 802.11 standard can be used to form a WLAN. Two or more devices can connect to the 802.11 WLAN and exchange data using the 802.11 standard. The 802.11 WLAN can interface with a cellular network, which can provide connectivity to the Internet or to another network. Devices on the 802.11 WLAN can then use the connectivity of the cellular network to exchange data with other devices on the cellular network, the Internet or another network connected to the cellular network.

FIG. 1 illustrates an exemplary 802.11 WLAN in a basic service set ("BSS") configuration. In the BSS configuration, one or more wireless nodes wirelessly connect to a NAP 54. As depicted in FIG. 1, the BSS 50 includes two wireless nodes. A personal digital assistant ("PDA") 52 links to the NAP 54 over an 802.11 interface 56, and a laptop computer 58 links to the NAP 54 over an 802.11 interface 60. While FIG. 1 only depicts two wireless nodes 52, 58, the BSS 50 may include a greater or fewer number of wireless nodes. Also, while FIG. 1 depicts a PDA 52 and a laptop computer 58, other devices, such as desktop computers, fax machines, printers, server and other wireless devices, may also be used.

In the BSS configuration, the wireless nodes 52, 58 can exchange data with each other through the NAP 54. For example, the PDA 52 can send a message to the NAP 54 that is then relayed to the laptop computer 58.

In another configuration, multiple NAPs can be linked together to form an extended services set ("ESS"). Thus, an ESS can include two or more BSSs. The wireless access points can be linked in a variety of different manners, such as through a wired Ethernet connection. Once linked together, wireless nodes connected to one NAP can exchange data with wireless nodes connected to another NAP. Additionally, a wireless node can roam among the different wireless access points in the ESS. The use of an ESS can advantageously extend the range of the 802.11 WLAN past the range supported by a single BSS.

In the BSS 50, the wireless nodes 52, 58 communicate with the NAP 54 over wireless 802.11 interfaces 56, 60. The IEEE 802.11 standard provides protocols for a physical ("PHY") layer, which specifies physical methods for transmitting bits of information over the 802.11 interfaces 56, 60. The IEEE 802.11 standard also provides for a MAC sub-layer, which can be used to format the bits sent over the 802.11 interfaces 56, 60 using one of the PHY layer protocols.

The IEEE 802.11 standard defines three different PHYs, each of which can be used to send data over the 802.11 interfaces 56, 60, and a BSS 50 will generally select one of the three PHYs to use for communications. The three PHYs are Direct Sequence Spread Spectrum ("DSSS"), Frequency Hopped Spread Spectrum ("FHSS") and Infrared ("IR").

Although any of the three PHYs may be used, DSSS and FHSS are the most common PHY implementations. DSSS and FHSS can be advantageously used over the 2.4 GHz ISM band that has been allocated by the United States Federal Communications Commission ("FCC") for unlicensed operation; however, other frequency bands may also be used.

In DSSS, information bits to be transmitted over the 802.11 interfaces 56, 60 are combined with a longer pseudo-random numerical sequence using the XOR function. The pseudo-random numerical sequence is typically an 11-bit Barker code. The resulting bit stream is then modulated onto a carrier frequency using differential phase shift keying ("DPSK") and transmitted to the NAP 54. At the NAP 54, a correlator removes the pseudo-random numerical sequence and recovers the original data stream. Thus, the 802.11 interfaces 56, 60 can be a common transmission channel used by the wireless devices 52, 58 and the NAP 54.

In FHSS, the carrier frequency "hops" from channel to channel in a pseudo-random manner. The wireless nodes 52, 58 and the NAP 54 hop in sequence with the carrier frequency changes. The information to be transmitted over the channel is modulated using a 2-level Frequency Shift Keying ("2FSK") or a 4-level Frequency Shift Keying ("4FSK."). Once received at the wireless node or the NAP, the received signal is demodulated to recover the original data stream. Similarly, the 802.11 interfaces 56, 60 in this configuration can form a common transmission channel used by the wireless devices 52, 58 and the NAP 54.

While the PHY protocols specify a method for the physical transmission of data over the 802.11 interfaces 56, 60, the MAC sub-layer protocols specify methods for allocating channel usage among the wireless nodes 52, 58 and the wireless access point 54 and for formatting the data transmitted over the transmission channel. The IEEE 802.11 standard specifies two different MAC sub-layer protocols, the Distributed Coordination Function ("DCF") and the Point Coordination Function ("PCF").

DCF generally uses Carrier Sense Multiple Access/Collision Avoidance ("CSMA/CA") to control access to the 802.11 interfaces 56, 60. Under CSMA/CA, if a station (i.e., a wireless node 52, 58 or the NAP 54) wants to transmit data it senses the transmission channel to determine if the transmission channel is idle. If the channel is idle, then the station can transmit data. If, however, the channel is busy because another station is transmitting, the station waits until the transmission channel becomes idle. Once the transmission channel becomes idle, the station uses a random backoff algorithm before again sensing the transmission channel to determine if it is available for transmissions. The random backoff algorithm helps to prevent multiple stations from simultaneously attempting to transmit over the transmission channel immediately upon completion of the previous transmission.

The Collision Avoidance mechanism of CSMA/CA uses an acknowledgment packet ("ACK") to help avoid data loss caused by two stations simultaneously transmitting data. A transmitting station transmits data to a receiving station. Once received, the receiving station checks the CRC of the received packet. If the CRC matches with the data received, the receiving station transmits an ACK back to the transmitting station. If a collision occurred, the CRC of the received packet would not match that of the received data because part of the data may be lost or incorrectly received. Therefore, no ACK would be sent from the receiving station to the transmitting station. After a predetermined period of time, the transmitting station would resend the packet to the receiving station.

As an alternative to CSMA/CA, the BSS 50 may optionally use VCS. VCS provides a method where a station can reserve the transmission channel for a specified period of time. This can be done using Request to Send ("RTS") and Clear to Send ("CTS") frames. A RTS frame can be sent from a wireless node to the NAP 54, and it can specify a period of time for which the wireless nodes wants to transmit over the transmission channel. In response, the NAP 54 sends a CTS frame to all the wireless nodes, and the CTS frame indicates a duration for which the transmission channel is reserved for the requesting wireless node.

VCS can advantageously help prevent collisions where the BSS 50 may have hidden nodes. A hidden node occurs when a wireless node can communicate with the NAP 54 but remains out of range from one or more of the other wireless nodes. Therefore, the hidden node would not receive the initial RTS frame sent by the other node, but it would receive the CTS frame sent by the NAP 54.

PCF is a second MAC-layer protocol defined by 802.11. PCF is an extension to DCF, and it may optionally be used in conjunction with DCF. In PCF, a point controller runs in the NAP 54. The point controller provides lower transfer delay variations in order to support time-bounded services, such as telephony.

In addition to specifying methods for handling channel usage, the MAC sub-layer protocols also specify methods for formatting data sent over the transmission channel. Data to be transmitted over the transmission channel can be formatted into a data frame. FIG. 2 is a block diagram illustrating an exemplary 802.11 MAC Sub-layer Data Frame. The Data Frame shown in FIG. 2 generally depicts nine fields, and each field may additionally include one or more sub-fields. The nine fields are Frame Control 80, Duration ID 82, Address1 84, Address2 86, Address3 88, Sequence Control 90, Address4 92, Frame Body 94 and FCS 96.

The Frame Control field 80 is 2-bytes long, and it comprises a number of sub-fields that carry formatting information. The sub-fields generally indicate a protocol version for the 802.11 standard. They can also indicate a function of the Data Frame, such as by indicating that it is a data frame instead of a control frame. Other formatting information, such as power management and fragmentation information can be carried in the Frame Control field 80.

The Duration ID 82 field is a 16-bit field that indicates a duration value for the frame. The four address fields 84, 86, 88, 92 indicate various addresses used in transmitting the Data Frame, such as a basic service set identifier ("BSSID"), a source address ("SA"), a destination address ("DA"), transmitting station address ("TA") and receiving station address ("RA").

The BSSID is a 48-bit field that uses the same format as an IEEE 802 MAC address, and it uniquely identifies each BSS. The DA includes an IEEE MAC individual or group address that identifies that station intended as the final recipient of the frame. The SA includes an IEEE MAC address that identifies the station from which the transfer of the frame was initiated. The RA includes an IEEE MAC address that identifies the intended immediate recipient station, and the TA includes an IEEE MAC address that identifies the station that has transmitted the frame.

The addresses carried by the four fields 84, 86, 88, 92 may vary based on values indicated in the Frame Control field 80. Specifically, the addresses carried by the four fields 84, 86, 88, 92 may vary based on the To DS and From DS sub-fields of the Frame Control field 80. Table 1 indicates the various addresses carried by the four fields 84, 86, 88, 92 for the four combinations of the To DS and From DS fields.

TABLE 1

| To DS | From DS | Address 1 | Address 2 | Address 3 | Address 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

The Sequence Control field 90 is a 16-bit field that indicates a sequence number and a fragment number for the frame. Each frame transmitted by a station is assigned a sequence number to identify the frame. The sequence number is also used by the destination device to reassemble the frames into their original order. A frame, however, may be fragmented into more than one frame during transmission. The fragment number identifies the various fragments of a frame and is used in reconstructing the original frame from its fragments.

The Frame Body field 94 is a variable length field. For example, it can range from 0 bytes to 2312 bytes. The Frame Body field 94 can carry the data in the Data Frame. The FCS field 96 carries a 32-bit Cyclic Redundancy Code ("CRC"). The CRC can provide error checking for the Data Frame so that the ultimate recipient of the frame can determine whether the frame was accurately received.

Using the PHY and MAC sub-layer protocols defined in 802.11, a wireless node can exchange data with another device on the 802.11 WLAN. For example, the PDA 52 can send data to the NAP 54, which can then relay the data to the laptop computer 58. Similarly, the laptop computer 58 can send data to the NAP 54, which can then forward the data to the PDA 52. Thus, the PDA 52 can communicate with the laptop computer 58.

The NAP 54 can additionally wirelessly interface with a cellular network 64 over a cellular interface 62. And, the cellular network 64 can connect to one or more packet data networks, such as the Internet 66. Using this connectivity, the NAP 54 can communicate with a device on the cellular network 64 or on a network connected to the cellular network 64. For example, the Network Interface 54 can communicate with a computer 68 on the Internet 66 using the cellular network's connectivity to the Internet 66. The wireless nodes 52, 58 can then also communicate with the computer 68 through the NAP's 54 cellular network connection.

Figure 3:
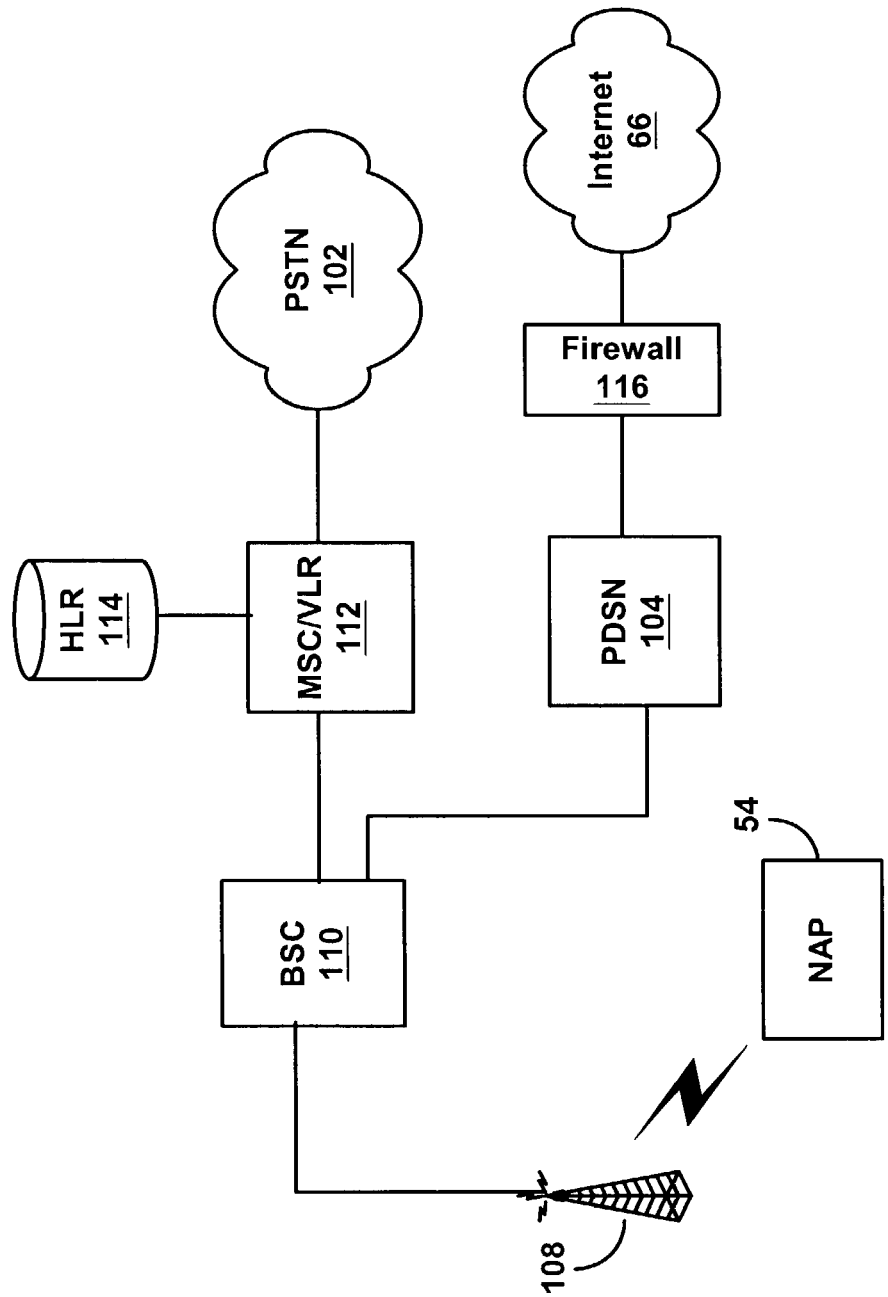
FIG. 3 shows an exemplary architecture that can be used as the cellular network depicted in FIG. 1.

FIG. 3 shows an exemplary architecture that can be used as the cellular network 64 depicted in FIG. 1. The NAP 54 links to a base transceiver station antenna ("base station") 108 through an air interface. The NAP 54 can communicate with the base station 108 using a variety of different protocols. In an exemplary embodiment, the NAP 54 communicates with the base station 108 using Code Division Multiple Access ("CDMA"). CDMA provides a method for sending wireless signals between the NAP 54 and the base station 108. In a CDMA system, the base station 108 communicates with the NAP 54 over a spread spectrum of frequencies.

In a CDMA system, multiple wireless devices may use the same frequency range, and the multiple wireless devices may each simultaneously communicate with the base station 108 using the same frequency range. The NAP 54 in a CDMA system spreads its signal across the frequency range. Spreading the signal across a wide bandwidth, such as approximately 1.266 MHz, can reduce interference between signals from different wireless devices. This can allow individual signals to be differentiated from other signals, and therefore, accurately recovered. In order to perform signal spreading, each NAP may be assigned a unique code, such as a Walsh code. The code may be a sequence of bits, such as a 64 bit binary number; however, other lengths may also be used.

The NAP 54 can transmit data by creating a modulated signal. The modulated signal may be created, for example, by modulating the wireless device's unique code with the data to be transmitted. In creating the modulated signal, the modulation bit rate of the code is ordinarily greater than the bit rate of the data. Once the modulated signal is created, it can then be sent over the common frequency range to the base station 108.

To accurately recover the modulated signal, the base station 108 can also store the unique code used by the NAP 54. Then, the base station 108 can monitor the frequency range for signals having the modulation pattern of the wireless device's code. This allows the base station 108 to differentiate the signal of the NAP 54 from the signals of the other wireless devices, such as other NAPs or cellular phones, which can appear as noise. After recovering the modulated signal, the base station 108, or other device, can then recover the data from the modulated signal. For example, the base station 108 can demodulate the modulated signal using the unique code for the NAP 54. Communication from the base station 108 to the NAP 54 can occur in a similar manner, although it may occur in a different frequency range.

A CDMA implementation will define one or more physical layer protocols and other layer protocols to be used in transmitting information between the NAP 54 and the base station 108 via the CDMA cellular interface 62. Each CDMA implementation may have its own variations of these protocols, which will also differ from the 802.11 PHY and MAC sub-layers. While a CDMA implementation may define different PHY and MAC layer protocols, it may alternatively use additional or different layers than the PHY and MAC layers.

For example, CDMA2000 defines a physical layer protocol that specifies a method to send physical bits over the cellular interface 62. Additionally, CDMA2000 defines a MAC layer protocol and a link access control ("LAC") layer protocol, both of which can be used to format physical bits into frames for transmission over the cellular interface 62 using the physical layer protocol. A MAC layer, LAC layer or other layer frame generally includes a header portion and a data portion. The data portion can be used to carry data. The header portion generally includes one or more sub-fields, which can be used for addressing, control and other information. The header sub-fields, the functions of the header sub-fields, the length of the frame and other characteristics can vary depending on the specific CDMA2000 implementation of the cellular network, and different cellular networks can use different implementations.

The MAC and LAC layers are generally two sub-layers of the data link layer in the Open Systems Interconnection ("OSI") reference model. The OSI reference model generally provides a protocol stack that can be used to exchange data between devices, although data communication between devices does not necessarily have to strictly adhere to each layer in the OSI reference model. Higher layers in the OSI model generally provide more robust features. Packets from higher layers are generally encapsulated into packets in decreasing layers until the lowest level packets, such as MAC layer packets, are ultimately transmitted over a physical medium using the physical layer protocol.

CDMA is described in further detail in Telecommunications Industry Association ("TIA") standards IS-95A and IS-95B. CDMA is also described in the TIA IS-2000 series of standards, which are commonly referred to as CDMA2000. The CDMA2000 physical layer is described in more detail in TIA/EIA/IS-2000-2a, which is incorporated herein by reference in its entirety. The CDMA2000 MAC layer is described in more detail in TIA/ELA/IS-2000-3a, which is incorporated herein by reference in its entirety. The CDMA2000 MAC layer is also described in more detail in "Medium Access Control (MAC) Standard for cdma2000 Spread Spectrum Systems," published by $3^{rd}$ Generation Partnership Project 2 ("3GPP2"), Version 1.0, April 2002, which is incorporated herein by reference in its entirety. The CDMA200 link access control layer is described in more detail in TIA/EIA/IS-2000-4a, which is incorporated herein by reference in its entirety. CDMA is further described in the International Telecommunications Union ("ITU") IMT-2000 series of standards.

Additional variations of CDMA or other protocols may also be used for communication between the NAP 54 and the base station 108. For example, the NAP 54 and the base station 108 may communicate using Wideband CDMA ("WCDMA"), Universal Mobile Telecommunications System ("UMTS"), Time Division-Synchronous CDMA ("TD-SCDMA"), Advanced Mobile Phone Service ("AMPS"), Digital AMPS ("D-AMPS"), Global System for Mobile Communication ("GSM"), General Packet Radio Services ("GPRS"), IS-136, Time Division Multiple Access ("TDMA") or other protocols.

Each of these protocols can define one or more MAC layers, LAC layers, data link layers or other layers above the physical layer. Each of the layers can use its own frame, and each layer may use more than one type of frame. For example, a layer can use one or more different frames to carry control information, and it can use one or more different frames to carry data information. The specific implementation layers and frame formats can differ among the various protocols; however, each frame generally includes both a data portion and a header portion. For example, depending on the protocol used by the cellular network and the specific implementation of the protocol by the cellular network, the header fields for these different types of frames can vary. Other characteristics, such as the length and function of the frames can also differ. More information about the layers and the frames used by the different protocols can be found in the respective standards documents for each of the protocols.

The base station 108 couples to a base station controller ("BSC") 110, which can perform various functions such as managing handoffs of the NAP 54 as it moves among base stations. The BSC 110 in turn connects to a mobile switching center ("MSC") 112. The MSC 112 can manage setup and teardown of connections with the NAP 54. While the BSC 110 and the MSC 112 are depicted as separate components, it is possible that their functionality may be combined into a single component.

The MSC 112 may also include a visitor location register ("VLR"). The VLR may be used to track wireless devices that travel away from their "home" MSC to another MSC. The VLR may receive information about a roaming NAP from the roaming wireless device's home MSC, and it may store that information. When the roaming NAP travels away from the MSC, the VLR may then remove information about that roaming wireless device.

Additionally, the MSC 112 may connect to a home location register ("HLR") 114. The HLR 114 can be a database that can store subscription information for wireless devices. Also, the HLR 114 can track the current location of wireless devices. For example, when a NAP roams away from its home MSC 112 to another MSC, the HLR 114 may be appropriately updated. Then, the HLR 114 can be used to route calls to the wireless device.

The MSC 112 can additionally provide connectivity to the PSTN 102. Using the connectivity, the NAP 54 may then communicate with another device that is also connected to the PSTN 102. The NAP 54 may also communicate with another device on the cellular network.

In addition to connecting to the MSC 112, the BSC 110 may also connect with a PDSN 104. The PDSN 104 can provide connectivity to a packet-switched network, such as the Internet 66, an intranet or another network. The PDSN 104 may connect to the Internet 66 through a firewall 116. The firewall 116 can be used to provide protection for the PDSN 104, for example by restricting access from the Internet 66 back through the firewall 116 to the PDSN 104. Once the NAP 54 connects, for example, to the Internet 66, it can exchange data with other devices that are also connected to the Internet 66.

For example, the NAP 54 may establish a Point-to-Point Protocol ("PPP") session with the PDSN 104. As is known in the art, PPP is a data link protocol for communication between two devices. PPP can provide a method for framing data sent between the two devices. Additionally, it can implement a link control protocol for controlling transmission links between the two devices, and it can provide a way to negotiate higher-level protocol options for communication between the two devices.

As a further part of establishing the PPP session, the NAP 54 may be assigned an Internet Protocol ("IP") address. This may be done, for example, after the NAP 54 has been authorized to access the cellular network 64. The IP address may be used by the NAP 54 to communicate in data sessions with other devices. For example, the NAP 54 can use its IP address to communicate with another device on the Internet 66, such as the computer 68.

While the NAP 54 may have a pre-assigned IP address, its IP address may be assigned at connection time. This may be done, for example, by using a Dynamic Host Control Protocol ("DHCP") application program. The DHCP application program may run on the PDSN 104, or it may run on another element. When the NAP 54 establishes a PPP session with the PDSN 104, the DHCP application program may assign the NAP 54 an IP address to use for that connection.

The NAP 54 may additionally run a Port Address Translation ("PAT") program. While the NAP 54 may be assigned one IP address when it connects to the cellular network 64, more than one wireless node in the BSS 50 may want to use the IP address assigned to the NAP 54, for example to communicate with a device on the Internet 66. The PAT program can be used to assign one or more unique identifiers to each wireless node. The unique identifiers, which are typically port assignments, can be used in conjunction with the single assigned IP address to identify packets for a particular wireless node. This allows each wireless node to engage in one or more unique sessions with other devices, such as devices on the Internet 66, using the single IP address assigned to the NAP 54.

PPP is described in more detail in Internet Engineering Task Force ("IETF") Request for Comments ("RFCs") 1661, 1662 and 1663, all of which are incorporated herein by reference in their entirety. DHCP is described in more detail in IETF RFCs 1541, 2131, 2132, which are all incorporated herein by reference in their entirety. PAT described in more detail in IETF RFC 3022, which is incorporated herein by reference in its entirety. More information on these and other IETF standards may be found at the URL "www.ietf.org."

Once connected to the PDSN 104, for example through a PPP session, the NAP 54 can access the Internet 66. While the NAP 54 may communicate with the PDSN 104 through a PPP session, it may communicate with other devices using higher-level protocols. For example, the NAP 54 may use IP to communicate with other devices on the Internet 66. IP provides a method for transmitting data between devices on the same or on different networks.

In IP communications, each device may be assigned an IP address, which is 32-bits long. The IP address assigned to a device is usually globally unique, and this allows data to be accurately sent between devices on different networks. Data to be transmitted between devices is placed into an IP packet. The IP packet can include a header portion and a data portion. The header portion generally identifies a source device and a destination device, while the data portion carries the data to be transmitted between the two devices.

Figure 4:
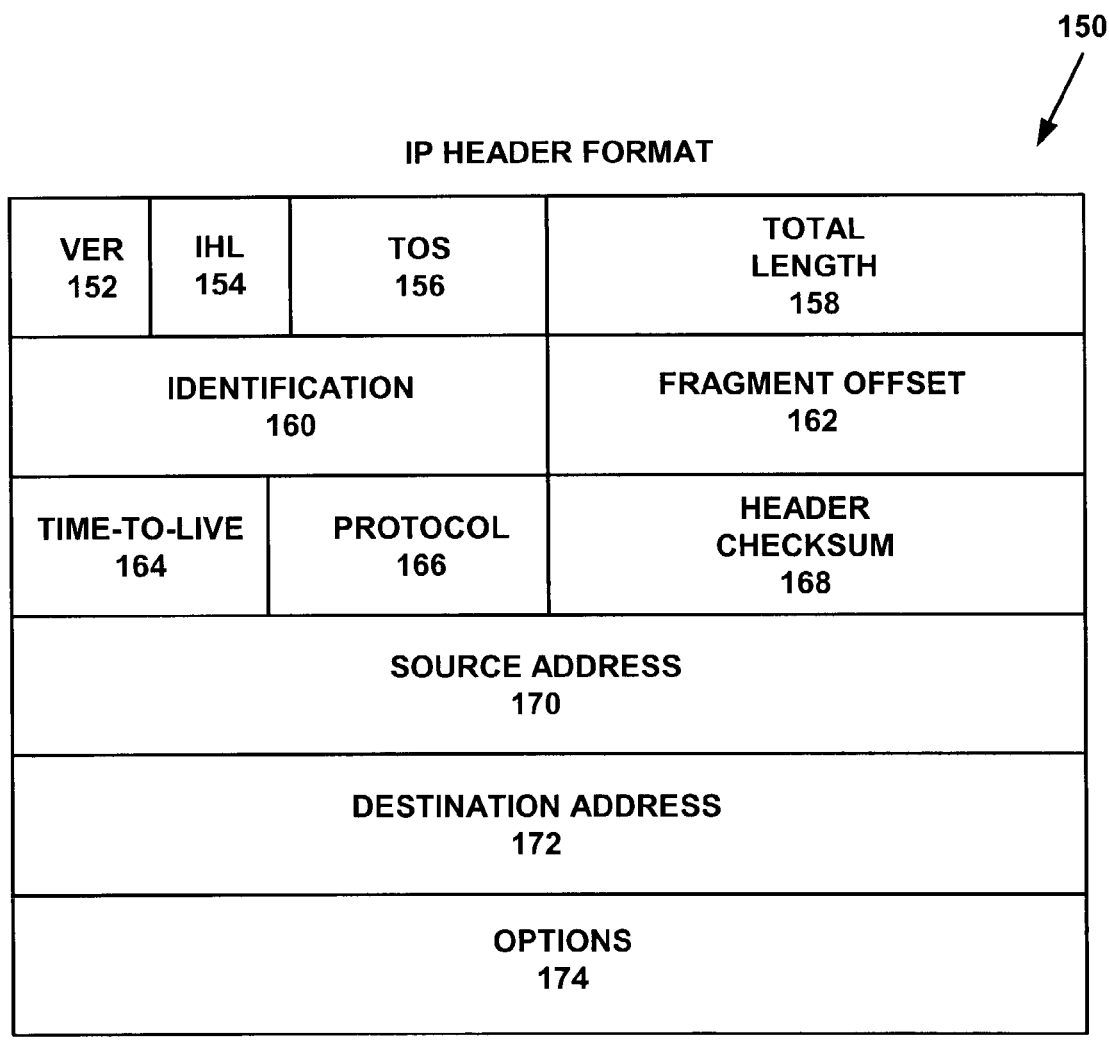
FIG. 4 is a block diagram illustrating an IP packet header.

FIG. 4 is a block diagram illustrating an IP packet header 150. The IP packet header 150 includes a number of different fields. The version field 152 can indicate an IP version, such as IPv4 or IPv6. The Internet Header Length ("IHL") field 154 can indicate the length of the header. The Type-of-Service ("ToS") field 156 can indicate a requested type of service. The total length field 158 can indicate the length of everything in the IP packet, including the IP header 150. The identification-field 160 may be used for packet fragmentation. The fragment offset field 162 can also be used for packet fragmentation. The Time-To-Live ("TTL") field 164 can be a hop count, which is used to limit the lifetime of the IP packet.

The protocol field 166 can indicate a protocol used with the IP packet. For example, Transmission Control Protocol ("TCP"), User Datagram Protocol ("UDP"), Encapsulating Security Payload ("ESP"), and Authentication Header ("AH") are common protocols that may be used in conjunction with IP. Other protocols may be used as well. The header checksum field 168 can be used to verify the contents of the IP packet header 150. The source address field 170 may include a source IP address for a sending device, and the destination address field 172 may include an IP address for a receiving device. The options field 174 can be used for security, source routing, error reporting, debugging, time stamping or other information. IP data may be carried in the IP packet data portion, which is generally appended below the options-field 174.

The IP packet is sent over the network, and, using the IP address in the destination address field 172 of the IP packet header 150, appropriately routed to the destination device. The packet may travel through different devices and across different networks before ultimately reaching its destination. The IP address can help to provide accurate routing through the intermediate devices to the intended destination device.

IP, however, does not provide a mechanism to assure that packets will be received at their intended destination. They may be lost during transmission due to data corruption, buffer overflow, equipment failure or other problems. TCP complements IP by ensuring reliable end-to-end transmission of the packets. Among other functions, TCP handles lost or corrupted packets, and it reassembles packets that arrive at their destination out of order. IP is described in more detail in IETF RFC 791, which is incorporated herein by reference in its entirety. TCP is described in more detail in IETF RFC 793, which is incorporated herein by reference in its entirety.

TCP/IP is one method for sending data between two devices, and other Internet or network protocols may also be used. For example, UDP may be used in conjunction with IP to exchange data between devices. UDP provides a connectionless protocol for exchanging data between devices, such as devices connected over an IP network. UDP does not guarantee reliable transmission between the devices, and it provides only minimal error protection. UDP is described in further detail in IETF RFC 768, which is incorporated herein by reference in its entirety.

Figure 5:
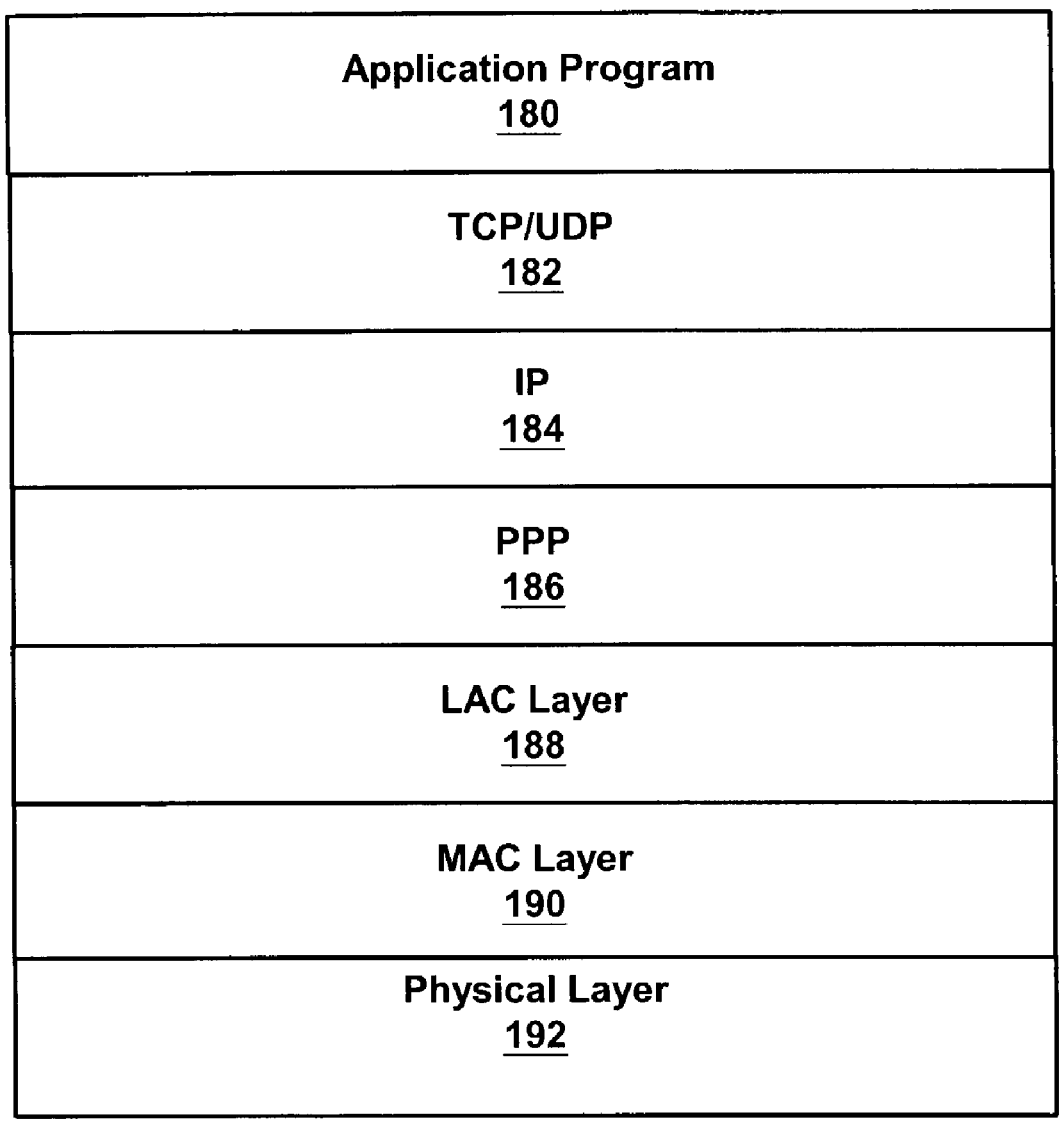
FIG. 5 is an exemplary protocol stack that the NAP can use for data transmission in a CDMA2000 cellular network.

FIG. 5 is an exemplary protocol stack that the NAP 54 can use for data communications in a CDMA2000 cellular network. One or more application programs run on the application program layer 180. Data from an application programs can be passed to the TCP/UDP layer 182, where it can be placed into a TCP or UDP packets. The TCP or UDP packets can then be passed to the IP layer, where they are placed into IP packets. At the PPP layer 186, IP packets are placed into PPP packets. The PPP packets can subsequently be placed into LAC packets at the LAC layer 188, and the LAC packets can be encapsulated into MAC packets at the MAC layer 190. Then, at the Physical layer 192, the MAC packets can then be transmitted over the CDMA2000 cellular interface 62 to the base station 108. Thus, higher layers provide more robust features and are generally carried in the data portions of lower layer packets. Packets received from the base station 108 via the CDMA2000 cellular interface 62 can also be processed in a similar manner.

The protocol stack of FIG. 5 is merely exemplary in nature for a CDMA2000 cellular network. Many variations are possible in both CDMA2000 cellular networks or in cellular networks using a different protocol. For example, additional layers may run between the Application Program layer 180 and the TCP/UDP layer. In another example, the LAC Layer 188 and the MAC Layer 190 may be merged into a single data link layer, or data from the PPP layer 186 could be passed directly to the MAC layer 190. In yet another example, one or more of the protocol stack layers may run a different protocol. For instance, the IP Layer 184 may run the Mobile IP protocol, which is an extension of IP.

The IP address assigned to the NAP 54 is generally associated with the NAP's home network. However, as is common, the NAP 54 may roam to one or more different networks. Mobile IP is an extension of IP that allows the NAP 54 to move transparently move between different "foreign" networks while still receiving data addressed to the IP address associated with the wireless device's home network. Using Mobile IP, the wireless device's movement away from its home network can appear transparent to protocol layers above IP (e.g., TCP or UDP). Mobile IP is described in more detail in IETF RFCs 2002-2005, each of which is incorporated herein by reference in its entirety.

Figure 6:
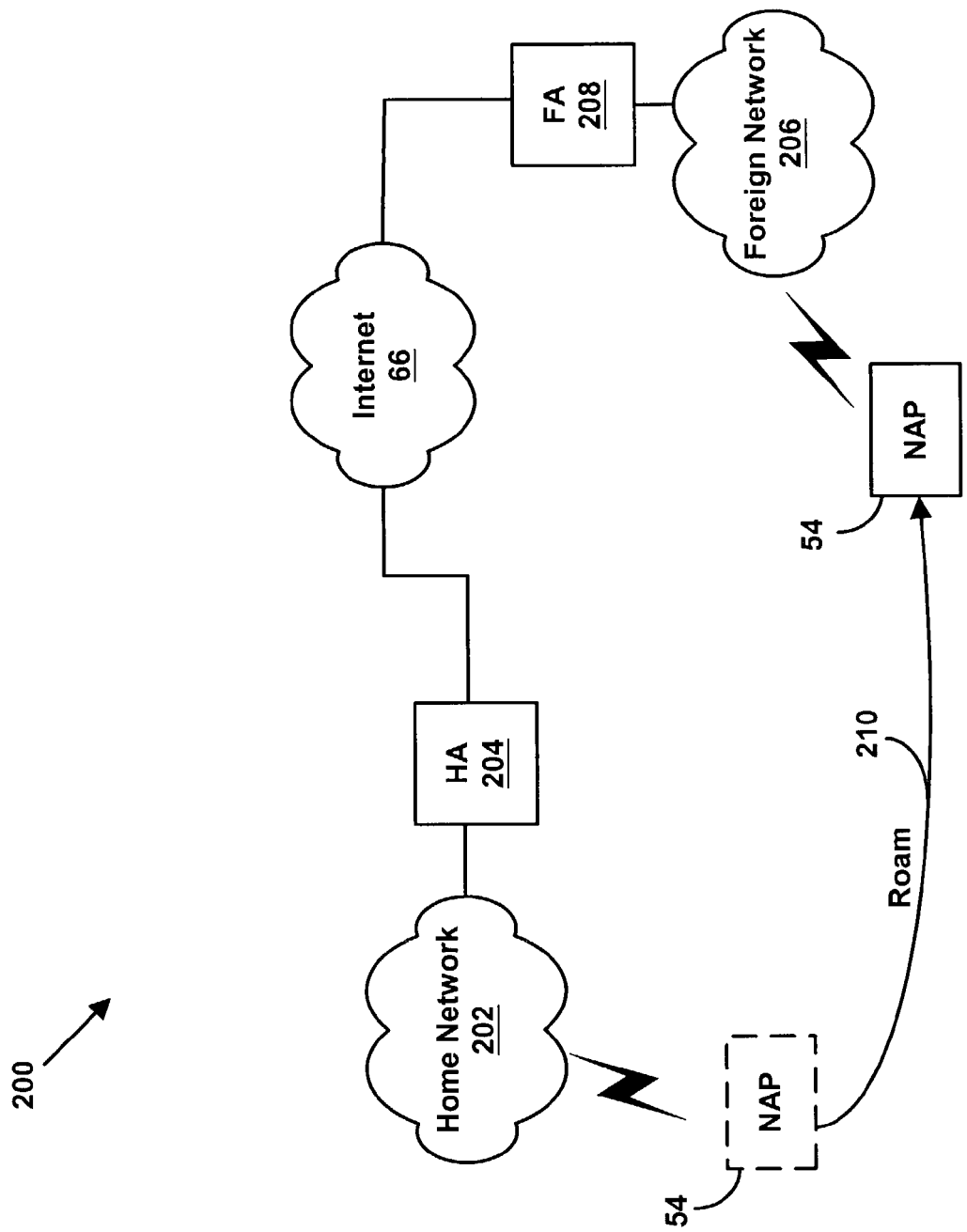
FIG. 6 is a block diagram illustrating an exemplary Mobile IP system.

FIG. 6 is a block diagram illustrating an exemplary Mobile IP system 200. The Mobile IP system 200 includes the NAP 54, referred to in Mobile IP terminology as a mobile node 54. The mobile node 54 can connect a home network 202, such as the cellular network 64 of FIG. 1. The home network 202 can in turn connect to an external network 66, such as the Internet or an intranet, via a home agent ("HA") 204. The home agent 204 can be a gateway router for the home network 202. As is known in the art, a gateway can connect networks that use different networking protocols or operate at different transmission capacities. As is also known in the art, a router can translate differences between network protocols and can route data packets to an appropriate network node or network device. By connecting to the home network 202, the mobile node 54 can communicate with devices connected to the Internet 66.

As indicted by the dashed outline, the mobile node 54 may "roam" away from its home network 202 and connect to a foreign network 206, such as another exemplary cellular network as depicted in FIG. 1. For example, the mobile node 54 may roam away from the home network 202 to the foreign network 206 as illustrated by path 210. When the mobile node 54 roams away from its home network 202, it periodically transmits Mobile IP "agent solicitation" messages to foreign agents, such a the foreign agent ("FA") 208 for the foreign network 206. The foreign agent 208 is foreign with respect to the mobile node's home network 202.

The foreign network 206 may also include one or more mobile nodes for which the foreign network 206 serves as the home network; however, no such mobile nodes are depicted in FIG. 6. The foreign agent 208 resides on a foreign network 206. The foreign agent 206, similarly to the home agent 204, can be a gateway router for the foreign network 206. The foreign agent 208 may be a separate component on the foreign network 206, or its functionality may be integrated into an existing component such as a PDSN.

As the mobile node 54 travels away from its home network 202, it may connect to a foreign network 206. The roaming mobile node 54 listens for mobile IP "agent advertisement" messages from foreign agents (i.e., foreign gateway routers such as the foreign agent 208). The agent advertisement messages can indicate that the roaming mobile node 54 is now on a foreign network 206. When the roaming mobile node 54 receives an agent advertisement message from a foreign agent, such as foreign agent 208, the mobile node 54 can register with the foreign agent (e.g., foreign agent 208) and also with its home agent (e.g., home agent 204). The registration can indicate that the mobile node 54 has roamed away from its home network 202 to a foreign network 206.

The mobile node 54 uses its home global address, such as its IP address, on the home network 202 to register with the foreign agent 208 and with the home agent 204. After registration of the mobile node 54, the foreign agent 208 may accept data packets for the mobile node 54 at the specific home global address for the mobile mode 106 in addition to data packets for other devices on the foreign network 206. The foreign agent 208 may also assign a temporary subnet network address on the foreign network 206 to the mobile node 54.

Figure 7:
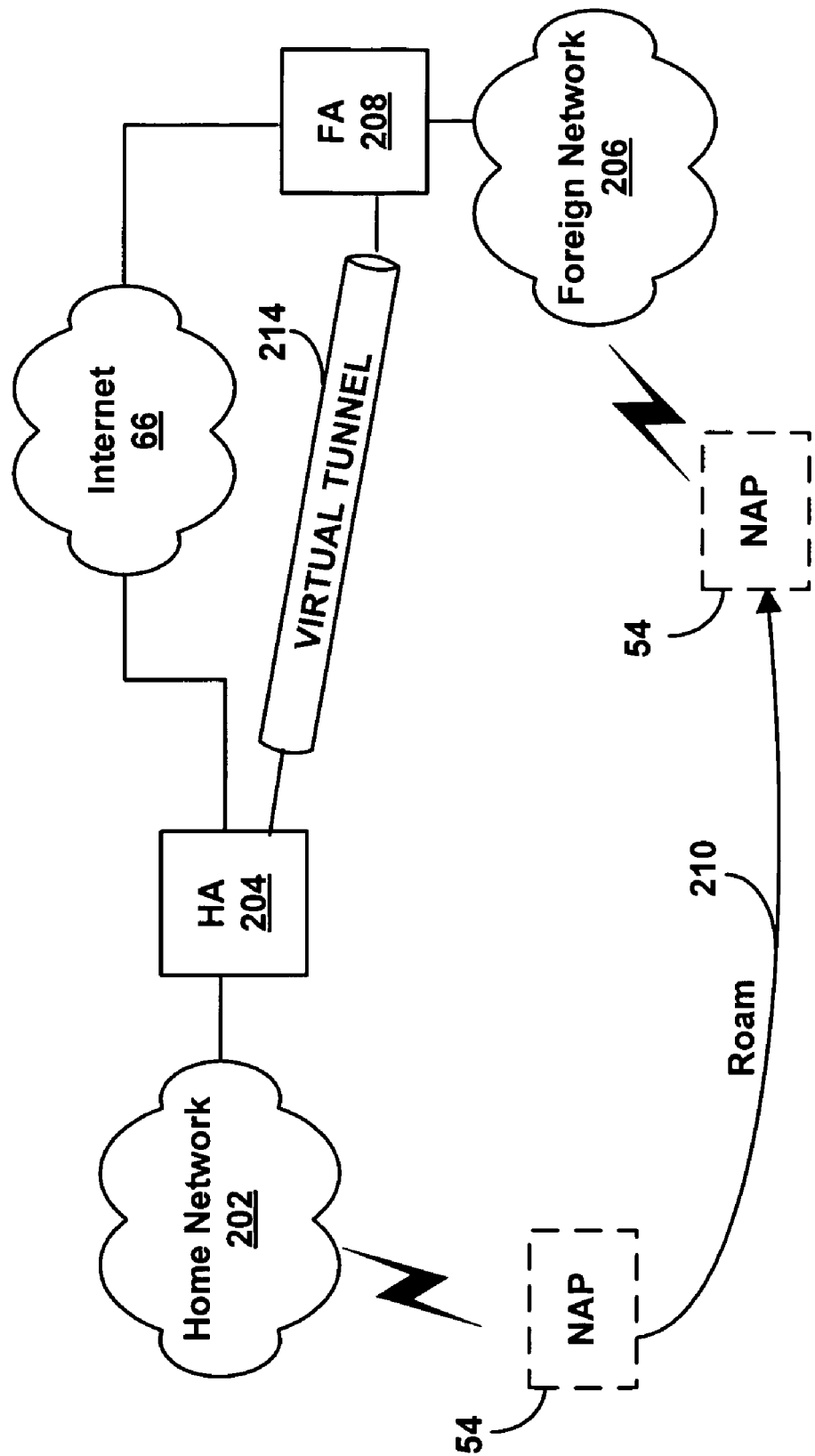
FIG. 7 is a block diagram illustrating exemplary Mobile IP communications in the Mobile IP system of FIG. 6.

FIG. 7 is a block diagram illustrating exemplary Mobile IP communications in the exemplary Mobile IP system of FIG. 6. Once the mobile node 54 roams to the foreign network 206 and registers its current location (e.g., on the foreign network 206 and on the home network 202), the home agent 204 may create a "virtual tunnel" 214 to the foreign agent 208 via the external network 204. The virtual tunnel 214 is not an additional physical connection created between the foreign agent 208 and the home agent 204, but rather the virtual tunnel 214 represents a conceptual data path for transmitting data between the home agent 204 and the foreign agent 208. The virtual tunnel 214 can be created by encapsulating a data packet inside another data packet and by adding additional tunnel packet headers. In one embodiment, IP-in-IP tunneling can be used. Other types of virtual tunnels, such as UDP tunneling or double IP-in-IP tunneling, can also be created, and these may also be used.

The network device 122 can send a data message addressed to the mobile node 54. This may be done, for example, by sending the mobile node 54 a packet addressed to its globally routable IP address. The packet travels through the Internet 66 and is routed to the home agent 204. The home agent 204 accepts packets addressed to IP addresses for devices in the home network 202. If the mobile node 54 were connected to the home network 202, the home agent 204 would forward the packet to the mobile node 54. However, the mobile node 54 is not connected to the home network 202. The mobile node 54 is connected to the foreign network 206, and the packet is forwarded from the home agent 204 to the foreign network 206.

The mobile node 54 previously registered its new location with the home agent 204 and with the foreign agent 208. The home agent 204 encapsulates the packet addressed to the mobile node 54 into a tunnel packet, which is sent to the foreign agent 208 through the virtual tunnel 214. When the foreign agent 208 receives the tunnel packet, it removes the tunnel packet header and routes the packet to the mobile node 54.

The cellular network 64 provides the NAP 54 with a wireless interface to the Internet 66 or to another network connected to the cellular network 64. Thus, the NAP 54 can advantageously move to various different locations covered by the cellular network 54 and connect to the Internet 66. Mobile IP can advantageously allow the NAP 54 to move to different locations, such as other locations within the cellular network 64 or another cellular network, while retaining its connection to the Internet 66. Similarly, the wireless nodes 52, 58 can move along with the NAP and remain connected to the Internet 66.

In one example of using the NAP's mobility provided by the cellular network 64, the BSS 50 could be located on a train, bus, airplane or other moving vehicle. The various wireless nodes 52, 58 in the BSS 50 could communicate with each other through the NAP 54. The relative proximity of the wireless nodes 52, 58 and the NAP 54 could be limited by the space of the vehicle. For instance, the wireless nodes 52, 58 could all be located within the vehicle and may also move around within the vehicle. The NAP 54 may also be located within the vehicle, such as in the vehicle or mounted to the outside of the vehicle. The NAP 54 can connect to the cellular network 64, and the cellular network 64 can in turn provide the NAP 54 and the wireless nodes 52, 58 with access to the Internet 66. As the vehicle changes location, the NAP 54 can maintain its connectivity with the Internet 66 by moving among various different base stations in the cellular network 64.

In another example of using the NAP's mobility provided by the cellular network 64, the NAP 54 can be conveniently moved among various different locations. For instance, the NAP 54 can be moved among different locations in a building or other area. At each location, the NAP 54 can connect to the cellular network 64, which can in turn provide connectivity to the Internet 66 for the NAP 54 and the wireless nodes 52, 58. The use of the cellular network 64 can eliminate the need to establish a wired connection at each NAP 54 location in order for the NAP 54 to be able to connect to the Internet 66.

The NAP 54 can be implemented in a variety of different ways. In one exemplary embodiment, the NAP 54 can be a computer having an 802.11 interface card and a cellular wireless interface card. The cellular wireless interface card can be a CDMA card, such as a Sprint PCS Wireless Web Modem™ Aircard 510, manufactured by Sierra Wireless. Of course, the different cards may be used, and the protocol used by the cellular wireless interface card may vary with the protocol used by the cellular network 64. Additionally, the cellular interface card can be a cell phone or other wireless device capable of communicating over the cellular network 64 and also capable of connecting to the NAP 54.

The 802.11 interface card can be used to communicate over an 802.11 wireless network. The 802.11 interface card can interface with the NAP 54 using a variety of different ports, such as a serial port, a parallel port, a Personal Computer Memory Card International Association ("PCMCIA") slot, a Universal Serial Bus ("USB") port or another type of connector. The cellular interface card can interface with the computer in a similar manner, although it may use a different type of interface than the 802.11 interface card.

The 802.11 interface card can support wireless communications with the 802.11 WLAN. For example, it can be used to wirelessly communicate with other devices using the 802.11 standard. The cellular interface card can likewise be capable of communicating with the cellular network 64. The computer could then be programmed to receive data using one of the interface cards, convert the data into a format for transmission using the other interface card, and then transmit the data using the other interface card.

Figure 8:
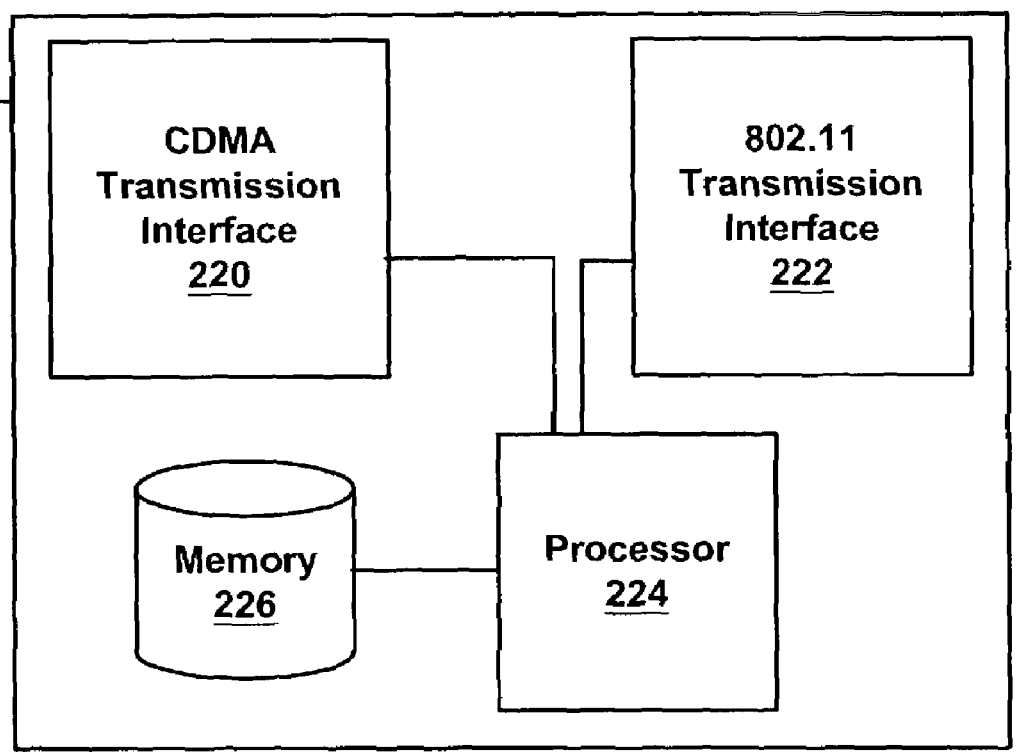
FIG. 8 is a block diagram of an exemplary implementation of the Network Access Point of FIG. 1.

FIG. 8 is a block diagram of one exemplary embodiment of the NAP 54 implemented as an application specific device. The NAP 54 includes a CDMA Transmission Interface 220 for communicating with a CDMA cellular network. The NAP 54 also includes an 802.11 Transmission Interface 222 for communicating with wireless nodes on the BSS 50 using the IEEE 802.11 protocol. The FIG. 8 depicts the NAP 54 with two separate transmission interfaces 220, 222; however, in an alternate embodiment they may be combined into a single transmission interface. Each transmission interface 220, 222 connects to a processor 224. The transmission interfaces 220, 222 can receive packets of data and send them to the processor 224. Similarly, the processor 224 can send packets of data to the transmission interfaces 220, 222, which can then be transmitted over the respective network.

The processor 224 connects to memory 226. The memory 226 can be a variety of different types of memory, such as a hard disk, a floppy disk, RAM, ROM, EPROM, EEPROM or other memory. The memory 226 can be programmed with an application, which can execute on the processor 224. The application can receive packets from one transmission interface, convert the packets into a format for transmission using the other interface, and then send the packets to the other interface for transmission.

In an alternate embodiment, the functionality of the NAP 54 can be distributed across a number of different components, each of which can be in a different location. For example, the CDMA transmission interface could be located on the outside of a vehicle in order to provide a clear link to the cellular network 54. The CDMA transmission interface could be linked, via a wired or wireless link, to a processing unit located in another location, such as inside the vehicle. The processing unit could handle the conversion between MAC sub-layer formats. The 802.11 could also be located inside the vehicle, such as in a location to provide a clear link to the devices on the WLAN. The 802.11 WLAN could also be linked, via a wired or wireless link, to the processing unit.

In another embodiment, the NAP 54 could be programmed so that it can interface with multiple types of cellular networks. For example it could connect to CDMA, W-CDMA and TDMA networks. Of course, other combinations are possible. Additionally, the NAP 54 could be programmed to link a variety of different types of wireless networks, which can use protocols other than 802.11, with the cellular network 64.

2. Exemplary Operation

Figure 9:
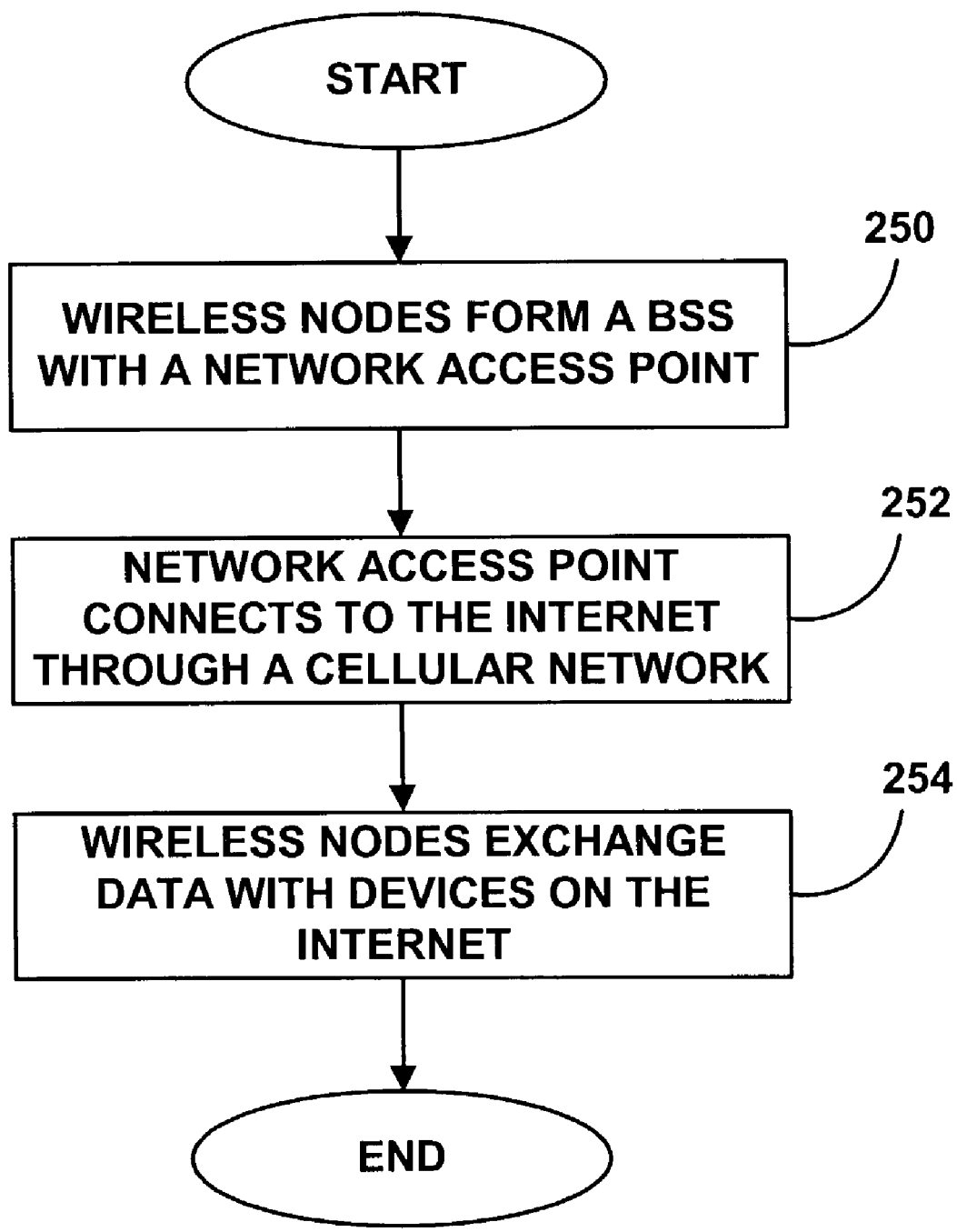
FIG. 9 is a flowchart of an exemplary operation of the Network Access Point of FIG. 1.

FIG. 9 is a flowchart of an exemplary process that the Network Access Point can use to bridge the BSS 50 and the cellular network 64. At Step 250, one or more wireless nodes form a BSS with the NAP. Then, at Step 252, the NAP connects to the Internet through a cellular network. As previously described, the NAP can wirelessly connect to the cellular network, and as part of the connection process the NAP can be assigned an IP address. The cellular network connects to the Internet, for example through a PDSN, and the NAP can use its assigned IP address in order to communicate with devices on the Internet. The NAP can, for example, also run a PAT program that allows one or more wireless nodes to use the single assigned IP address in order to exchange data with devices on the Internet. Then, at Step 254, the wireless nodes can exchange data with devices on the Internet or on another network using the connectivity provided by the cellular network.

It should be understood that many variations could be made to the process described in FIG. 9. For example, the Network Access Point can connect to the cellular network before connecting to any wireless nodes in the BSS. Then, one or more wireless nodes may join the BSS and receive connectivity to the Internet. Additionally, wireless nodes may also leave the BSS, for instance to join a different BSS. Of course, one or more wireless nodes may join the BSS before the NAP connects to the cellular network, and wireless nodes may then subsequently join or leave the BSS.

In another variation, one or more of the wireless nodes may use its own IP address to communicate with other devices, such as ones on the Internet. Alternatively, the cellular network can assign more than one IP address to the NAP, and the IP addresses can then be used by the wireless nodes. These variations are not exhaustive, and others also exist.

Figure 10:
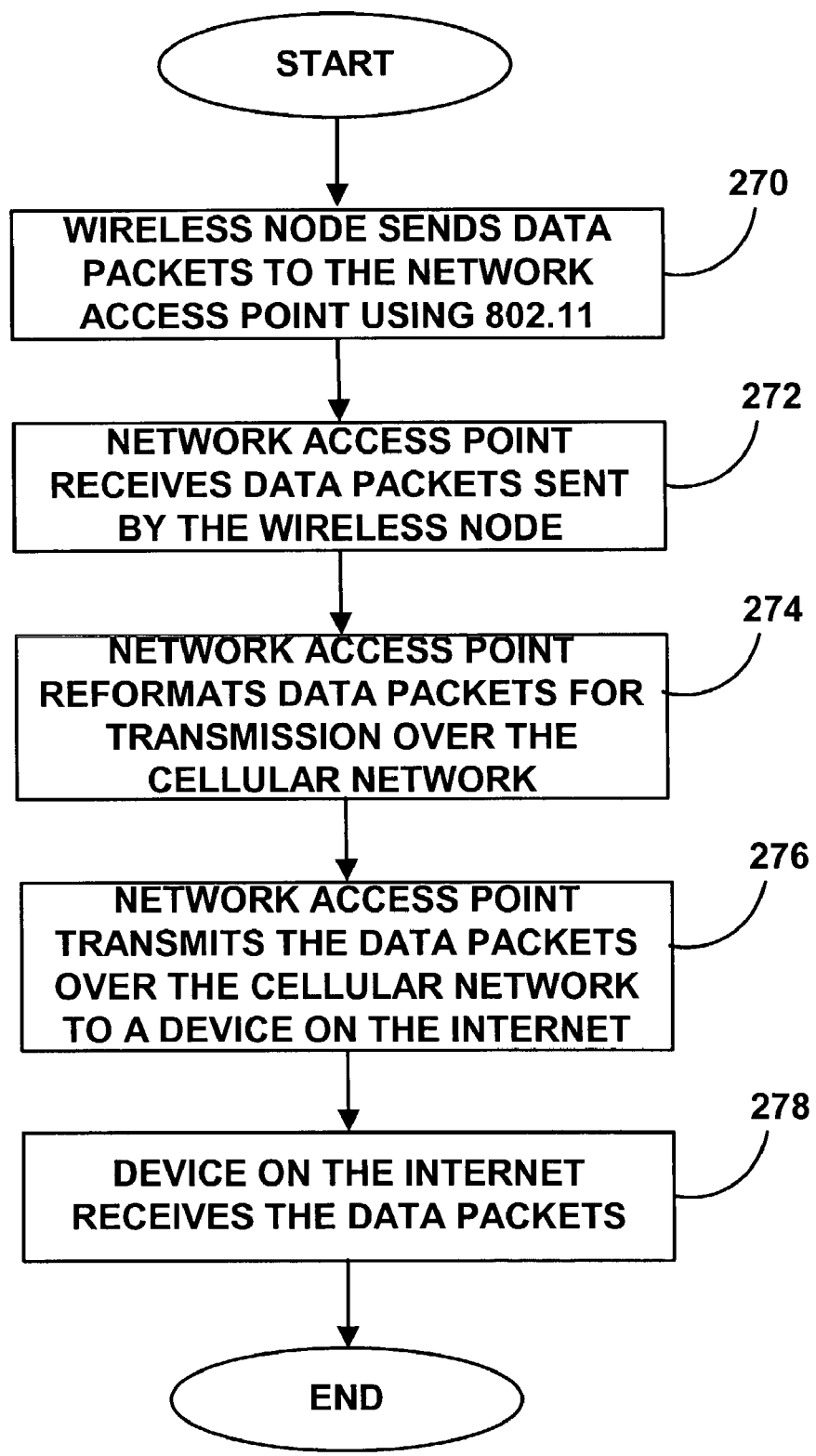
FIG. 10 is a flowchart of an exemplary process for a wireless node using the Network Access Point of FIG. 1 to exchange data with a device on the Internet.

FIG. 10 is a flowchart of an exemplary process for a wireless node exchanging data with a device on the Internet. The process of FIG. 10 may be used, for example, as Step 254 in FIG. 9. With reference to FIG. 10, at Step 270, the wireless node sends data packets to the NAP using the IEEE 802.11 protocol. The packets are generally formatted and sent from the wireless node to the NAP using the MAC sub-layer protocols specified by the IEEE 802.11 protocol. The data portion of the MAC sub-layer packets may carry packets from higher protocol levels, such as IP, TCP or other protocol levels. At Step 272, the NAP receives the MAC sub-layer packets sent by the wireless node. Next, at Step 274, the NAP reformats the MAC sub-layer packets for transmission over the cellular network.

In one example of reformatting the data packets, the NAP converts the packets from the 802.11 MAC sub-layer format used by the wireless node into a format used by the cellular network. For instance, the cellular network may use a different MAC sub-layer format, or the cellular network may use a data-link layer format or another type of format to transmit data packets. The NAP can convert a packet, for example, by removing the data portion of the 802.11 MAC sub-layer packet and placing it into the data portion of a cellular network MAC sub-layer packet. The NAP can additionally set the header fields of the cellular network MAC sub-layer packet, which may differ from the header fields of the 802.11 MAC sub-layer packet. If the cellular network doesn't use a MAC sub-layer format, the NAP can perform a similar conversion by removing the data portion of the 802.11 MAC sub-layer packet and placing it into packet using a different data-link format or another type of format used by the cellular network. The NAP can also set the heading information of the packet.

Since the MAC sub-layer packets can carry higher-level protocol packets in their data portions, the reformatting of the MAC sub-layer packets does not necessarily affect the higher-level protocol packets carried by the MAC sub-layer packets. After reformatting the MAC sub-layer packets, as shown at Step 276, the NAP transmits the reformatted data packets over the cellular network to a device, such as one on the Internet. Finally, at Step 278, the device receives the transmitted data packets, and it can then retrieve the data sent by the wireless node.

Figure 11:
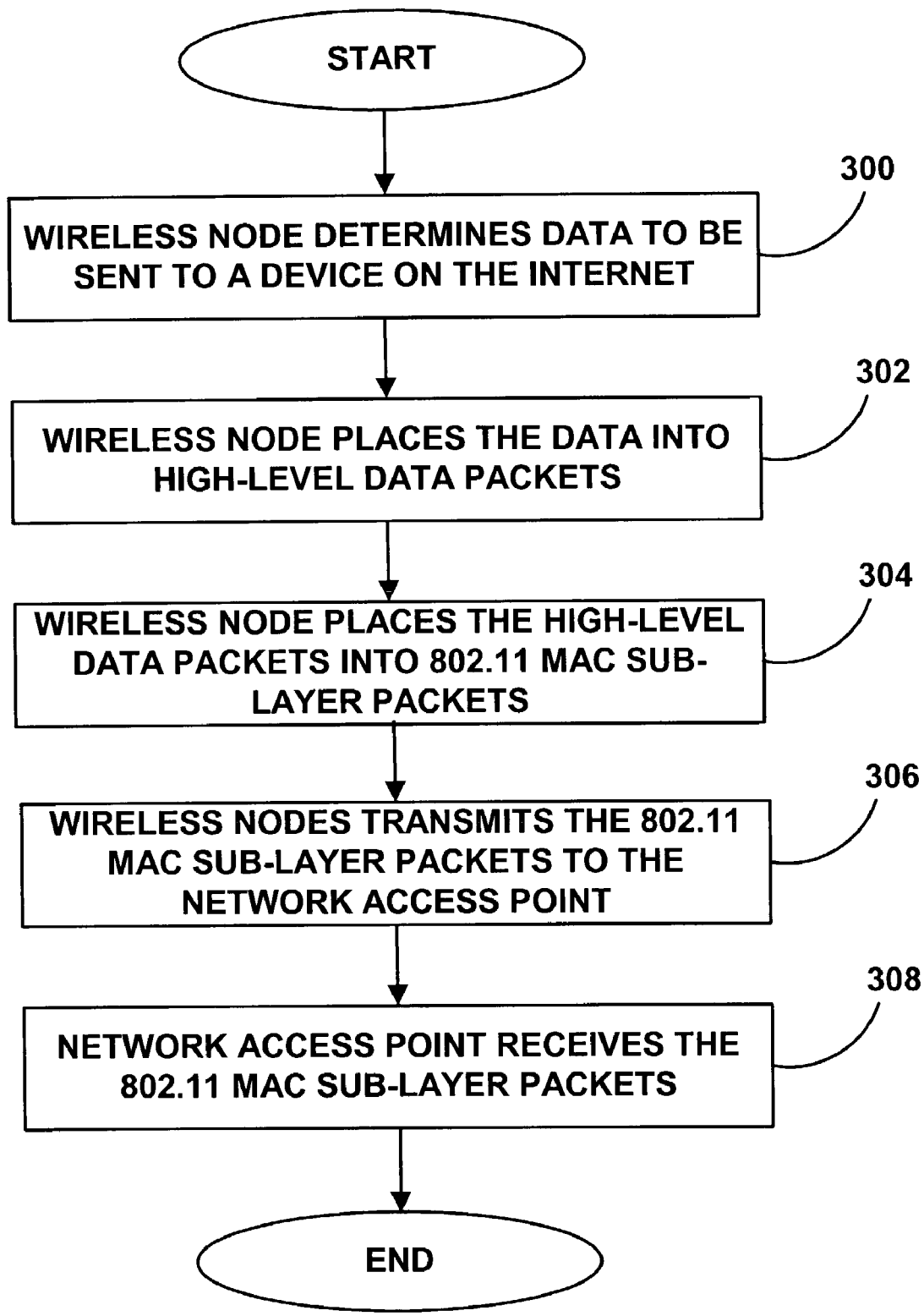
FIG. 11 is a flowchart of an exemplary process for a wireless node formatting and sending data packets to the Network Access Point of FIG. 1.

FIG. 11 is a flowchart of an exemplary process that a wireless node can use to format and send data packets to the NAP using the 802.11 protocol. This process may be used, for example, as Step 270 of FIG. 10. With reference to FIG. 11, at Step 300, the wireless node determines data to be sent to a device, such as a device on the Internet. Then, at Step 302, the wireless node places the data into one or more high-level data packets, generally in a decreasing order of the levels the protocol stack used by the wireless node.

For example, an application running on the wireless node can determine data to be sent to the device. This generally occurs at the application layer in the OSI reference model. Then, the application data determined by the application program can be placed into a TCP packet, which is a transport layer protocol in the OSI reference model. As previously discussed, TCP provides a method for reliable transmission of data over the Internet. In another example, the application data may be placed in a UDP packet, which is also a transport layer protocol. Then, the TCP, UDP or other packets can be subsequently placed into one or more lower-level packets. For example, the TCP, UDP or other packets can be placed in IP packets, which is a network layer protocol. As previously discussed, IP provides a method for transmitting packets between devices on the same or different networks. The IP packet may further be encapsulated into lower-level packets.

Then, at Step 304, the wireless node places the high-level data packets into 802.11 MAC sub-layer packets. The packets placed into the MAC sub-layer packets are generally from the protocol layer running directly above the MAC sub-layer. For example, the wireless node may place IP packets into the 802.11 MAC sub-layer packets; however, the IP packets may further be encapsulated into other lower-level packets before finally being placed into the 802.11 MAC sub-layer packets. Next, at Step 306, the wireless node transmits the 802.11 MAC sub-layer packets to the NAP. This can be done, for instance, using one of the 802.11 PHY protocols. Then, at Step 308, the NAP receives the 802.11 MAC sub-layer packets transmitted by the wireless node.

Figure 12:
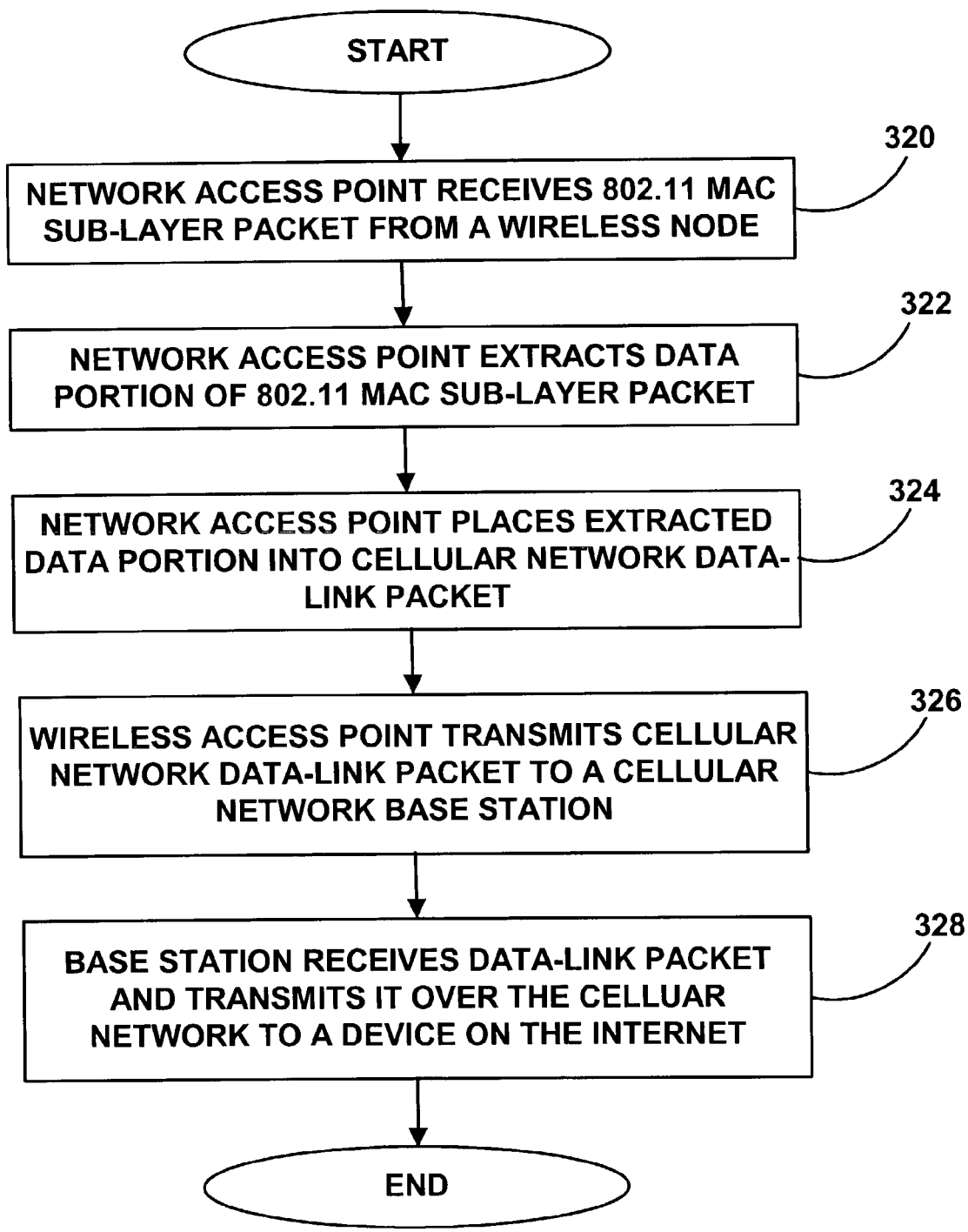
FIG. 12 is a flowchart of an exemplary process for the Network Access Point of FIG. 1 802.11 reformatting MAC sub-layer packets for transmission over the cellular network.

FIG. 12 is a flowchart of an exemplary process for the NAP reformatting 802.11 MAC sub-layer packets for transmission over the cellular network. This process can be used, for example, as Step 274 of FIG. 10. With reference to FIG. 12, at Step 320, the NAP receives an 802.11 MAC sub-layer packet from a wireless node. Then, at Step 322, the NAP extracts the data portion of the 802.11 MAC sub-layer packet. Next, at Step 324, the NAP places the extracted data portion into a packet using a cellular network format. For example, the cellular network may use a different MAC sub-layer format, a data link format or a different type of format that corresponds to the 802.11 MAC sub-layer format. The NAP can also configure a header of the packet used by the cellular network. Once the packet is reformatted, the NAP wirelessly transmits the reformatted packet to a cellular network base station, shown at Step 326. Finally, at Step 328, the base station receives the data-link packet and transmits it over the cellular network to a device, such as one on the Internet.

While the previous flowcharts have described communication from a wireless node to another device through the cellular network, the NAP can also be used in a similar manner for transmissions to the wireless node, such as from a device on the cellular network or on the Internet. For example, a device on the Internet can determine application data, or other data, to be sent to a wireless node. The Internet device can format the data, such as by placing it in TCP, IP or other packets. Those packets can then be placed into data-link or MAC sub-layer packets for transmission via the cellular network to the NAP. Once the NAP receives the packets, the NAP can reformat the packets for transmission over the 802.11 MAC sub-layer to the wireless node.

Figure 13:
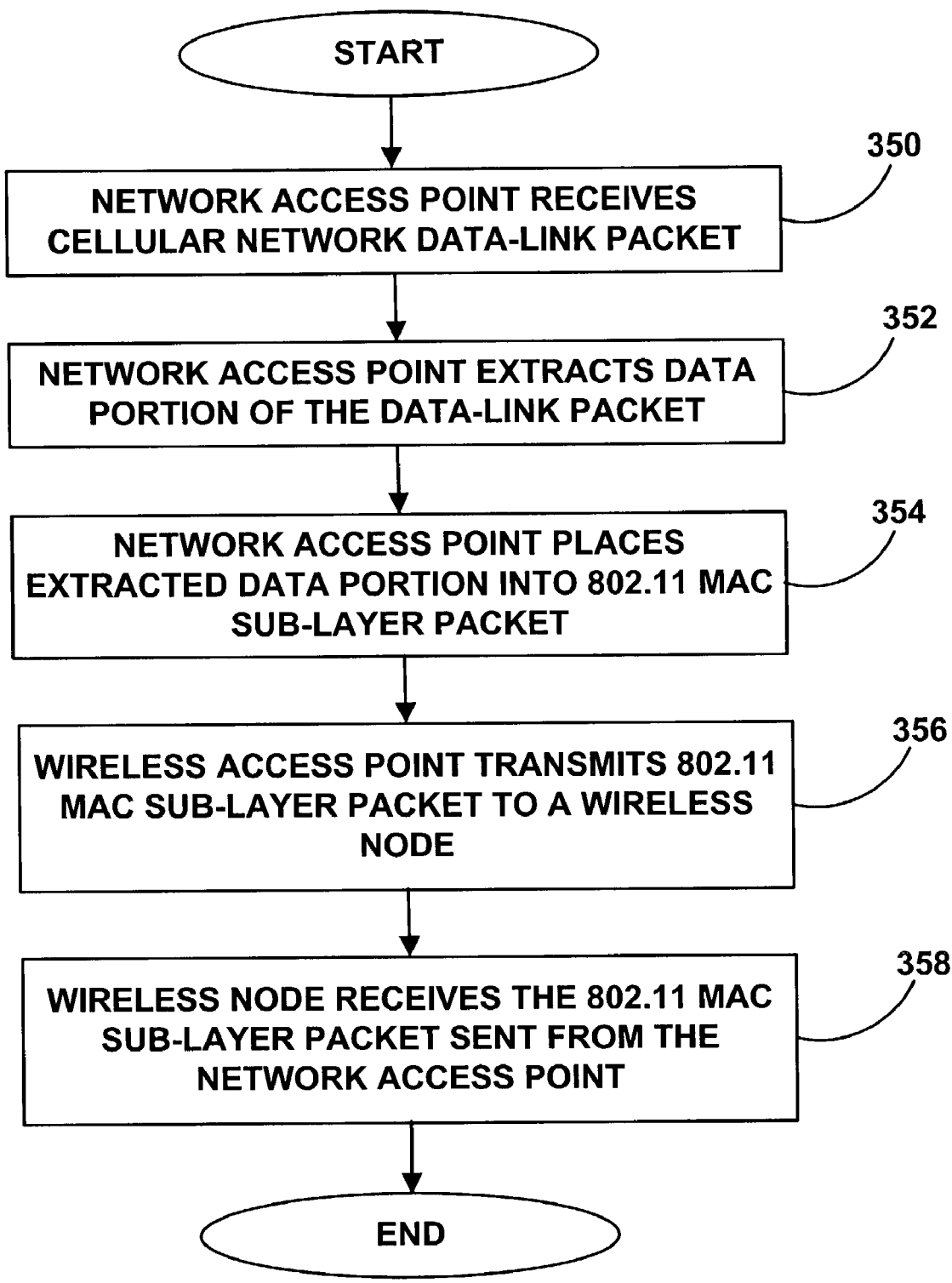
FIG. 13 is a flowchart of an exemplary process for the Network Access Point of FIG. 1 reformatting MAC sub-layer packets from a cellular network format into an 802.11 format.

FIG. 13 is a flowchart of an exemplary process that the NAP can use to reformat packets received from a cellular network base station into an 802.11 format for transmission to a wireless node. At Step 350, the NAP receives a cellular network data-link packet, such as one transmitted to the NAP by the base station. The base station can transmit the packet using a data-link format supported by the cellular network, such as a CDMA or other data-link format. Of course, a MAC sub-layer or other type of protocol could also be used. Then, at Step 352, the NAP can extract the data portion of the data-link packets.

Next, at Step 354, the NAP places the extracted data portion into an 802.11 MAC sub-layer packet. At Step 356, the wireless access point transmits the 802.11 MAC sub-layer packet to the wireless node. Then, at Step 358, the wireless node receives the MAC sub-layer packet from the NAP, and the wireless node can extract the data from the received packet.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not necessarily be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for bridging an 802.11 WLAN and a cellular network, comprising:

receiving at an 802.11 interface of a network access point (NAP) a packet from a wireless node on the 802.11 WLAN, the packet being formatted according to a format used by the 802.11 WLAN;

an application, executing on a processor in the NAP, receiving the packet from the 802.11 interface, converting the packet from the format used by the 802.11 WLAN into a format used by the cellular network, the packet being thereby converted into a cellular packet, and transferring the cellular packet to a cellular network interface of the NAP, the cellular packet including an Internet Protocol (IP) address assigned to the NAP; and sending the cellular packet over the cellular network from the cellular network interface.

2. The method of claim 1, wherein converting the packet from the format used by the 802.11 WLAN into a format used by the cellular network comprises:

converting the packet from a MAC sub-layer format used by the 802.11 WLAN into a data link format used by the cellular network.

3. The method of claim 1, wherein converting the packet from the format used by the 802.11 WLAN into a format used by the cellular network comprises:

converting the packet from a MAC sub-layer format used by the 802.11 WLAN into a MAC sub-layer format used by the cellular network.

4. The method of claim 1, wherein sending the cellular packet over the cellular network comprises:

sending the cellular packet over a CDMA interface to a base station.

5. The method of claim 1, wherein the IP address assigned to the NAP is included in a source address field of the cellular packet.

6. The method of claim 1, further comprising:

the NAP assigning an identifier to the wireless node.

7. The method of claim 6, wherein the cellular packet includes the identifier.

8. The method of claim 6, wherein the identifier is a port assignment.

9. A method for sending data between an 802.11 WLAN and a cellular network, the method comprising:

receiving at a cellular network interface of a network access point (NAP) a packet from the cellular network, the packet being formatted according to a format used by the cellular network, the packet including an Internet Protocol (IP) address assigned to the NAP;

an application, executing on a processor in the NAP, receiving the packet from the cellular network interface, converting the packet from the format used by the cellular network into a format used by the 802.11 WLAN, the packet being thereby converted into an 802.11 packet, and transferring the 802.11 packet to an 802.11 interface of the NAP; and transmitting the 802.11 packet to a wireless node on the 802.11 WLAN from the 802.11 interface.

10. The method of claim 9, wherein receiving at the cellular network interface a packet from the cellular network comprises:

receiving a packet over a CDMA interface with the cellular network.

11. The method of claim 9, wherein converting the packet from the format used by the cellular network into a format used by the 802.11 WLAN comprises:

converting the packet from a data link format used by the cellular network into a MAC sub-layer format used by the 802.11 WLAN.

12. The method of claim 9, wherein converting the packet from the format used by the cellular network into a format used by the 802.11 WLAN comprises:

converting the packet from a MAC sub-layer format used by the cellular network into a MAC sub-layer format used by the 802.11 WLAN.

13. The method of claim 9, wherein the IP address assigned to the NAP is included in a destination address field of the packet.

14. The method of claim 9, further comprising:

the NAP assigning an identifier to the wireless node.

15. The method of claim 14, wherein the packet from the cellular network includes the identifier.

16. The method of claim 14, wherein the identifier is a port assignment.

17. A network access point (NAP) comprising:

a processor;

data storage;

an 802.11 wireless communication interface;

a CDMA wireless communication interface;

machine language instructions stored in the data storage and executable by the processor (i) to receive outgoing 802.11 packet data from an 802.11 station via the 802.11 wireless communication interface, (ii) to convert the outgoing 802.11 packet data into outgoing MAC sub-layer packet data, and (iii) to send the outgoing MAC sub-layer packet data via the CDMA wireless communication interface to a packet-switched network, the outgoing MAC sub-layer packet data including an Internet Protocol (IP) address assigned to the NAP.

18. The NAP of claim 17, wherein the machine language instructions are further executable by the processor (i) to receive incoming MAC sub-layer packet data via the CDMA wireless communication interface from the packet-switched network, the incoming MAC sub-layer packet data including the IP address associated with the NAP, (ii) to convert the incoming MAC sub-layer packet-data to incoming 802.11 packet data, and (iii) to send the incoming 802.11 packet data via the 802.11 wireless communication interface to the 802.11 station.

19. The NAP of claim 17, wherein the machine language instructions are further executable by the processor to record in the data storage a correlation between communications with the 802.11 station and communications with the packet-switched network.

20. The NAP of claim 19, wherein the machine language instructions are executable to perform port address translation, and wherein the correlation comprises a correlation between (i) a TCP or UDP port and (ii) an ID of the 802.11 station.

* * * * *